United States Patent
McClure et al.

(10) Patent No.: US 8,006,939 B2
(45) Date of Patent: Aug. 30, 2011

(54) OVER-WING TRAVELING-WAVE AXIAL FLOW PLASMA ACCELERATOR

(75) Inventors: Paul D. McClure, Fort Worth, TX (US); Charles J. Chase, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 361 days.

(21) Appl. No.: 11/562,777

(22) Filed: Nov. 22, 2006

(65) Prior Publication Data
US 2008/0116808 A1    May 22, 2008

(51) Int. Cl.
*B64C 21/00* (2006.01)
(52) U.S. Cl. .................. 244/205; 244/130
(58) Field of Classification Search .......... 244/50, 244/205, 171.5, 199.1, 198, 200.1, 204, 204.1
See application file for complete search history.

(56) References Cited

U.S. PATENT DOCUMENTS

| | | | |
|---|---|---|---|
| 2,763,125 A | | 9/1956 | Kadosch et al. |
| 3,095,163 A | * | 6/1963 | Hill .............. 244/12.1 |
| 3,171,060 A | * | 2/1965 | Wood et al. ........ 315/111.61 |
| 3,360,220 A | * | 12/1967 | Meyer ............ 244/205 |
| 3,374,629 A | | 3/1968 | Boucher |
| 3,392,941 A | | 7/1968 | Cason, III |
| 3,613,370 A | | 10/1971 | Paine |
| 4,638,216 A | | 1/1987 | Delaunay et al. |
| 4,891,600 A | * | 1/1990 | Cox ............... 315/501 |
| 5,320,309 A | * | 6/1994 | Nosenchuck et al. ..... 244/205 |
| 5,791,275 A | * | 8/1998 | Bandyopadhyay ...... 114/67 R |
| 5,847,493 A | | 12/1998 | Yashnov et al. |
| 5,890,681 A | * | 4/1999 | Meng ............ 244/205 |
| 6,096,160 A | | 8/2000 | Kadomura |
| 6,215,124 B1 | | 4/2001 | King |

(Continued)

FOREIGN PATENT DOCUMENTS
EP    1 672 966 A    6/2006
(Continued)

OTHER PUBLICATIONS

"Topical Review; Plasmas in high speed aerodynamics; TopicalReview"; Journal of Physics D. Applied Physics, Institute of Physics Pblishing, Bristol, GB; vol. 38, No. 4; Feb. 21, 2005; pp. 33-R57.

(Continued)

*Primary Examiner* — Joshua J Michener
*Assistant Examiner* — Brian M O'Hara
(74) *Attorney, Agent, or Firm* — Bracewell & Giuliani LLP

(57) ABSTRACT

A method to manipulate a fluid flow over a surface is provided. This method may be used to reduce drag, improve the lift to drag (L/D) ratio, attach fluid flow, or reduce flow noise at the surface. This involves flowing a fluid over the surface wherein the fluid contains positively charged ions and electrons. An electric field accelerates ions and electrons in directions parallel to the electric field. A magnetic field at the surface redirects ions and electrons based on their velocity and charge. The magnetic field imparts little force on the relatively heavy and slow moving positive ions but has a significant impact on the relatively fast moving, light weight electrons. This results in a non-zero net change in the total momentum of the positive ions and electrons allowing thrust to be realized. This thrust may be sufficient for vehicle propulsion or manipulation of the fluid flow around the vehicle. Pulsed and traveling wave implementations of this body force enable exploitation of frequencies to which the flow is sensitive, improving effectiveness of this method.

15 Claims, 7 Drawing Sheets

U.S. PATENT DOCUMENTS

| | | | |
|---|---|---|---|
| 6,220,549 B1* | 4/2001 | Tsunoda et al. | 244/205 |
| 6,332,593 B1* | 12/2001 | Kamiadakis et al. | 244/204 |
| 6,345,791 B1 | 2/2002 | McClure | |
| 6,523,338 B1 | 2/2003 | Kornfeld et al. | |
| 6,644,014 B2 | 11/2003 | Provitola | |
| 6,696,792 B1 | 2/2004 | Foster | |
| 6,777,862 B2 | 8/2004 | Fisch et al. | |
| 6,803,705 B2 | 10/2004 | Kornfeld et al. | |
| 6,805,325 B1* | 10/2004 | Malmuth et al. | 244/205 |
| 6,960,888 B1 | 11/2005 | Foster | |
| 7,084,572 B2 | 8/2006 | Kornfeld et al. | |
| 7,174,703 B2 | 2/2007 | Hartley | |
| 7,236,344 B2 | 6/2007 | McCullough | |
| 7,247,992 B2 | 7/2007 | Kornfeld et al. | |
| 7,247,993 B2 | 7/2007 | Kornfeld et al. | |
| 7,413,149 B2* | 8/2008 | Minick et al. | 244/205 |
| 2005/0034464 A1 | 2/2005 | Gonzalez | |
| 2005/0212442 A1* | 9/2005 | Kornfeld et al. | 315/111.61 |
| 2006/0150611 A1* | 7/2006 | Allen | 60/203.1 |
| 2008/0023589 A1* | 1/2008 | Miles et al. | 244/205 |
| 2008/0277004 A1 | 11/2008 | Hagseth | |

FOREIGN PATENT DOCUMENTS

| | | |
|---|---|---|
| EP | 1 681 465 A | 7/2006 |
| GB | 738511 A1 | 10/1955 |
| RU | 2076829 C1 | 4/1997 |
| WO | WO2007/123612 A2 | 11/2007 |

OTHER PUBLICATIONS

"Topical Review; Plasmas in high speed aerodynamics; Topical Review"; Journal of Physics D. Applied Physics, Institute of Physics Pblishing, Bristol, GB; vol. 38, No. 4; Feb. 21, 2005; pp. 33-R57; pp. R49-52.

Office Action for co-pending U.S. Appl. No. 11/564,384, dated Apr. 29, 2009, 13 pages.

* cited by examiner

US 8,006,939 B2

OVER-WING TRAVELING-WAVE AXIAL FLOW PLASMA ACCELERATOR

TECHNICAL FIELD OF THE INVENTION

The present invention relates generally to manipulation of fluid flow and more particularly, a system and method for manipulating an ionized fluid flow over a surface.

BACKGROUND OF THE INVENTION

Aircraft typically require complex, heavy, mechanical flap surface actuation systems for vehicle flight stability and control. While very effective aerodynamically, these flap-based controls require powerful and heavy hydraulic or electric actuation systems to move the flap effectors. Furthermore, the flap surfaces are structurally inefficient in that they introduce discontinuities in the airframe surface which requires additional structural weight for support. Current emphasis for next-generation aircraft require a dramatic reduction in airframe weight and cost while maintaining performance and capability.

Active flow control involves modification of the turbulent structure of eddies in most complex flows with the intent to improve aerodynamic performance of air vehicle flight control and propulsion systems. Such capability can increase range and maneuverability, reduce acoustic loads, signature, weight, and cost. In some systems, a relatively small amount of high-momentum secondary fluid is used to enhance the naturally occurring instabilities of the main flow. For example, it is known to use active flow control in applications such as favorably influencing the flow over aerodynamic surfaces, heating/cooling components, vectoring a primary fluid flow, and mixing fluids.

The aerodynamic design and integration of the control surfaces within next generation aircraft plays a major role in determining the capability and configuration of these aircraft. Next generation tailless aircraft will be highly integrated where components are buried or submerged into the platform. Additionally, exotic shapes may cause excessive propulsion performance losses. These losses may emanate from strong secondary flow gradients in the near wall boundary of the fluid flow, which produce large-scale vertical flow field structures. Flow field detachments may produce increased body drag and aerodynamic buffeting. All of which compromise the integrity and capability of these aircraft.

In the past, adverse flow fields were avoided or addressed by the aircraft's design. Alternatively, active control surfaces have been used to address flow field structures associated with exotic shapes. For example, the overall aircraft could be lengthened to prevent aft body flow field detachments or additional control surfaces could be incorporated into the vehicle to also prevent aft body flow field detachments. Other solutions may have required that certain components be structurally hardened (increasing weight) or replaced more frequently to avoid failures resulting from these stresses. Components may also be repositioned to non-optimal positions to reduce these stresses. However, these situations often result in reduced vehicle performance. Similarly, adding structural weight to support increased stress loads also results in reduced vehicle performance.

The aerodynamic design and integration of the control surfaces plays a major role in determining the capability and configuration of aircraft such as the unmanned aerial vehicle (UAV), long-range strike (LRS), and multi-mission air mobility systems. To enable advances in vehicle design, groundbreaking aerodynamic technologies are required to integrate control surfaces into these advanced platforms. New technologies are required to meet the more restrictive requirements associated with reduced weight/volume and mechanical complexity while aerodynamically accommodating exotic vehicle shaping requirements, without compromising functionality and performance.

To address integration issues associated with control surfaces, previous solutions required additional hydraulic and structural systems to support the required control systems. The consequences of such solutions compromise vehicle capability.

New technology is therefore needed which will allow greater freedom to integrate control systems within advanced aircraft designs. The benefits of such integrated designs for advanced planforms will be to enable reduced vehicle size and weight, favorable movement of vehicle center of gravity (Cg) forward, reduced drag, reduced aft body structural heating, and improved flight performance. Application of such a technology is not only limited to being a design enabler for future all-wing air-vehicle designs, but also could be applied to existing aircraft to improve vehicle control.

Further limitations and disadvantages of conventional control surfaces and related functionality will become apparent to one of ordinary skill in the art through comparison with the present invention described herein.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

Embodiments disclosed herein may be better understood, and their numerous objects, features, and advantages made apparent to those skilled in the art by referencing the accompanying drawings. The use of the same reference symbols in different drawings indicates similar or identical items.

DETAILED DESCRIPTION OF THE INVENTION

Preferred embodiments of the present invention are illustrated in the figures like numerals being used to refer to like and corresponding parts of the various drawings.

Embodiments disclosed herein provide a plasma flow accelerated through an electric field to manipulate a fluid flow over a surface. These embodiments may be applied to a fully fixed, non-articulating geometry vehicle that substantially eliminates or reduces disadvantages and problems associated with previous designs. The invention is not limited to fixed geometry vehicles. Helicopter and variable sweep aircraft are examples of articulating geometry applications.

In physics and chemistry, plasma (also called an ionized gas) is an energetic state of matter in which some or all of the electrons in the outer atomic orbital rings have become separated from the atom. Excitation of plasma requires partial ionization of neutral atoms and/or molecules of a medium. There are several ways to cause ionization including collisions of energetic particles, strong electric fields, and ionizing radiation. The energy for ionization may come from the heat of chemical or nuclear reactions of the medium, as in flames, for instance. Alternatively, already released charged particles may be accelerated by electric fields, generated electromagnetically or by radiation fields.

There are two broad categories of plasma, hot plasmas and cold plasmas. In hot plasma, full ionization takes place, and the ions and the electrons are in thermal equilibrium. A cold plasma (also known as a weakly ionized plasma) is one where only a small fraction of the atoms in a gas are ionized, and the electrons reach a very high temperature, whereas the ions remain at the ambient temperature. These plasmas can be created by using a high electric field, or through electron bombardment from an electron gun, and other means.

Figure 1:
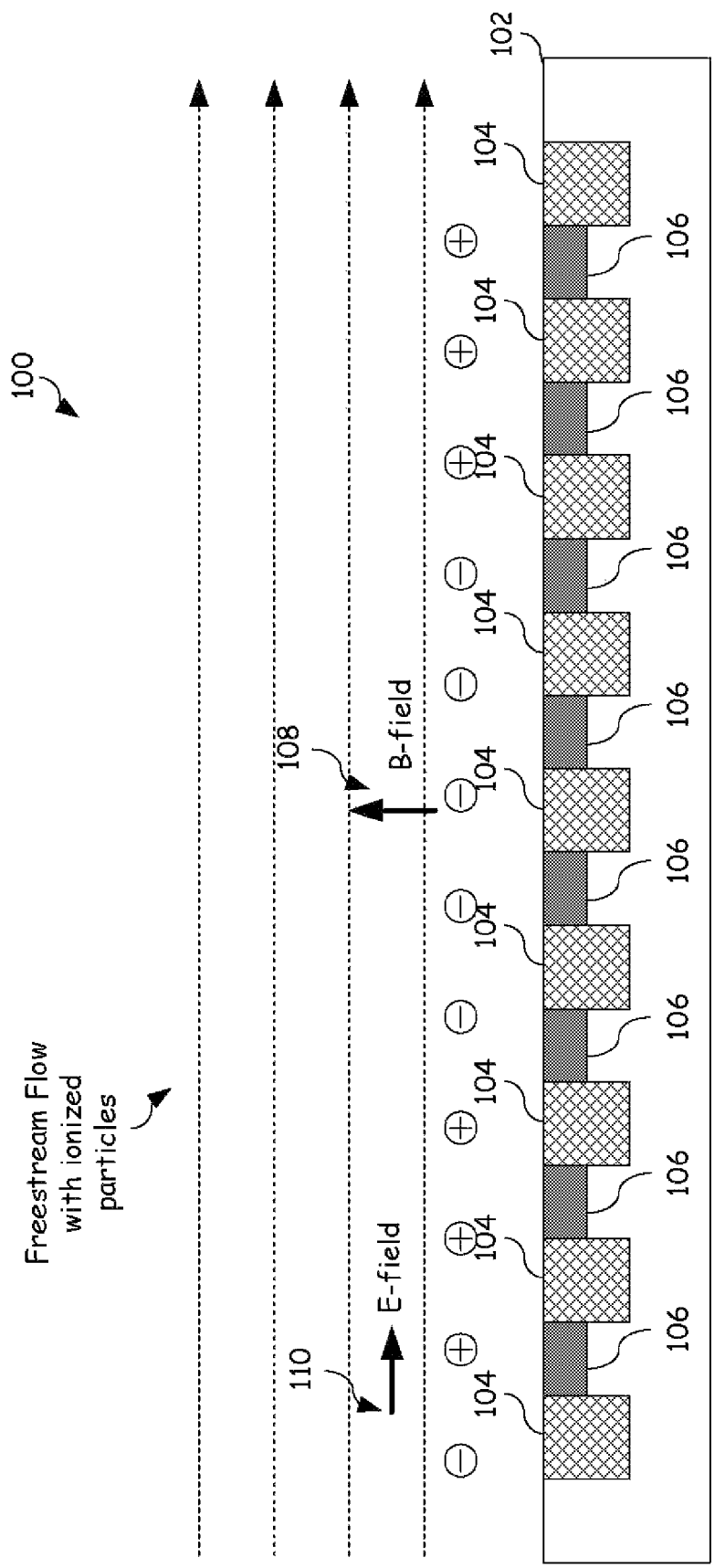
FIG. 1 depicts an axial flow plasma accelerator that may be used to manipulate fluid flow over a surface in accordance with embodiments of the present invention.

FIG. 1 depicts an axial flow plasma accelerator 100 that may be used to manipulate fluid flow over a surface. Plasma accelerator 100 includes a surface 102, electrodes 104, magnetic material or magnets 106. As shown free stream fluid flow 101 passes over surface 102. A series of electrodes 104 may be embedded within or at surface 102. These electrodes may generate an electric field 110 that may accelerate ions within the free stream flow. These ions may be accelerated in a direction parallel to the electric field as shown here in FIG. 1. Other embodiments may accelerate the ionized particles in other directions within the plane of the fluid flow as will be discussed later. Magnets 106 may be embedded within or at surface 102. These magnets generate a magnetic field 108 normal to surface 102. The force due to an electric field $\vec{E}$ is defined from the Coulomb's law: $\vec{F}=q\vec{E}$. The electric field $\vec{E}$ accelerates the ionized fluid (indicated by "+" symbols) within fluid flow toward an aft portion of surface 102, while the electrons (indicated by "−" symbols) are accelerated in the opposite direction.

The force due to a magnetic field $\vec{B}$ is defined from the Lorentz Force Law, and specifically from the magnetic force on a moving charge: $\vec{F}=q\vec{v}\times\vec{B}$. The Lorentz Force law is accurately modeled by $\vec{F}=q\vec{E}+q\vec{v}\times\vec{B}$ where x indicates a vector cross product an $\vec{F}$, $\vec{E}$, $\vec{v}$, and $\vec{B}$ are vectors for the Force, Electric Field, Velocity, and Magnetic Field respectively. This relationship explains why the force on the electron is large when compared to the force experienced by the positively charged ions. The electric field force on the ion and the electron are opposite but equal (opposite due to the opposite charge). However, the velocity of the electrons is very large due to the electron's small mass. However, the velocity of the ions is small due to the same Electric field force acting on their relatively large mass. The force from the magnetic field is large on the electron because the electron has a large velocity in a direction normal to the B-field. The ion velocity is small in comparison to that of the electron. Thus the magnetic field $\vec{B}$ force acting on the ion is small.

Figure 2:
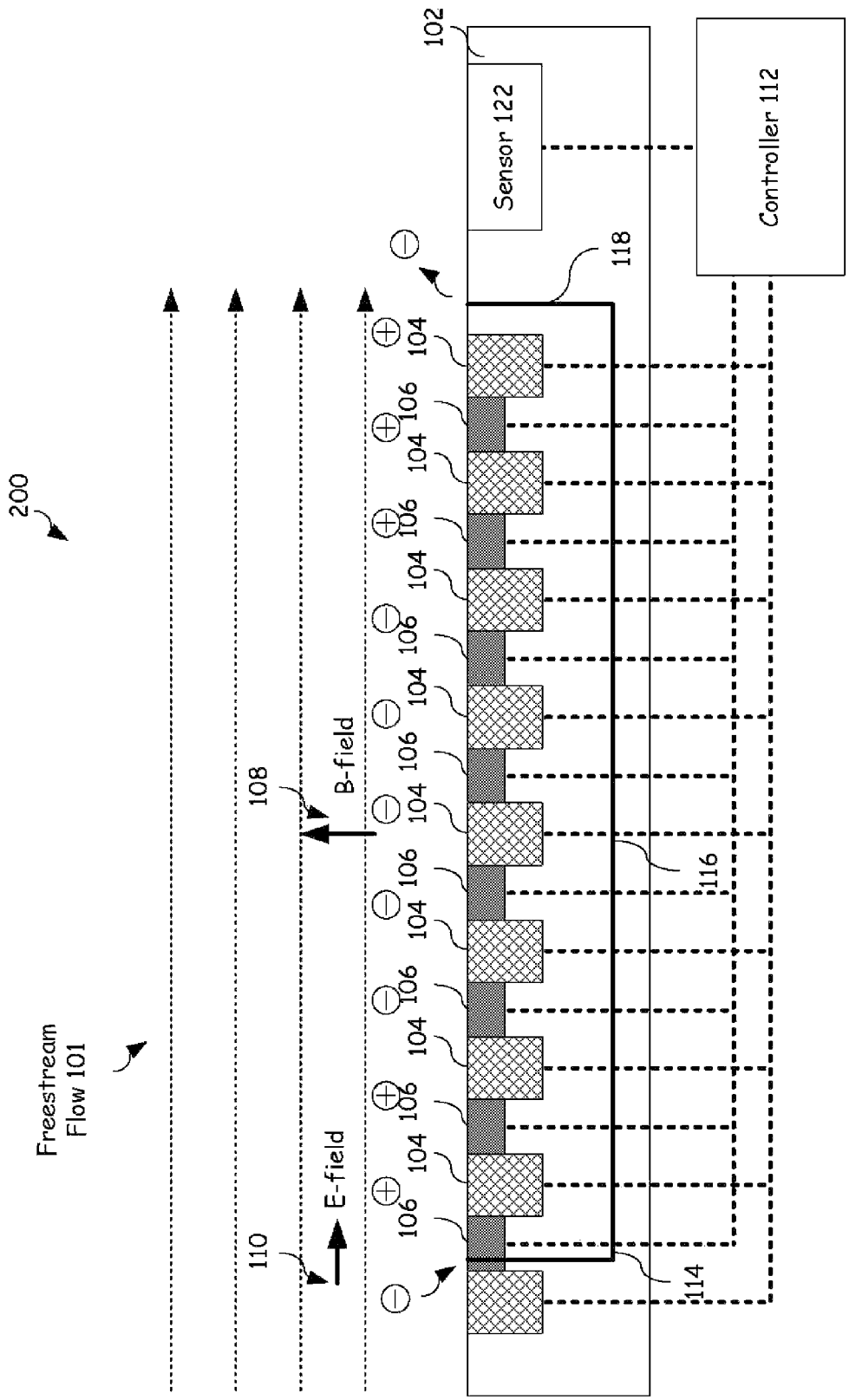
FIG. 2 depicts a second axial flow plasma accelerator that may be used to manipulate fluid flow over a surface in accordance with embodiments of the present invention.

The magnetic field $\vec{B}$ in FIGS. 1 and 2 is applied substantially normal to the direction of the fluid flow and creates a large force on the electrons. The force of magnetic field $\vec{B}$ mitigates the momentum of the electrons. The magnetic field at the surface imparts little force on the relatively heavy and slow moving positive ions but has a significant impact on the relatively fast moving, light weight electrons. This results in a non-zero net change in the total momentum of the positive ions and electrons allowing thrust to be realized.

FIG. 2 depicts an axial flow plasma accelerator 200 that may be used to manipulate fluid flow over a surface. FIG. 2 adds a controller 112 operable to modulate the frequency and amplitude of the electric field $\vec{E}$ to manipulate the acceleration of the ionized fluid. Controller 112 may also modulate the amplitude of the magnetic field $\vec{B}$ where electro magnets or super conducting magnets are used.

Electrons may be collected using positive electrical terminal(s) 114, such as a cathode. Positive terminal 114 can be coupled to a conductive element 116 and configured to transport the electrons to a location downstream of the electrodes. A negative terminal 118 such as an anode can be coupled to the other end of conductive element 116 at a downstream location, where the electrons can be re-inserted into fluid flow 101 to help neutralize the charge of fluid flow 101. In addition, a Hall current will flow in a direction perpendicular to both the electric field and the magnetic field. To enhance this current, additional electrodes should be coupled such that this Hall current can flow unimpeded.

Controller 112 can be configured to receive information from one or more sensor(s) 122 regarding the characteristics of fluid flow 101 at some downstream location, and control operation of plasma generator 124 and electro-magnetic accelerator 126. Controller 112 can also control the operation of magnets 106 when they take the form of electromagnets or superconducting magnets. When a pulsed electric field to the electromagnetic accelerator 200, the strength and/or the pulse frequency of the electric field can be varied, depending on the force required from fluid flow.

Controller 112 is typically implemented with a processing system that can be embodied in any suitable computing device(s) using any suitable combination of firmware, software, and/or hardware, such as microprocessors, Field Programmable Gate Arrays (FPGAs), Application Specific Integrated Circuit (ASTCs), or other suitable devices. Controller 112 can be coupled to a power supply (not shown) to control power supplied to plasma generator 124 and electromagnetic accelerator 126. Sensor(s) 122 can also provide information regarding the velocity, pressure, temperature, and other characteristics of fluid flow 101 to controller 112 to operate electrodes 106 and plasma generator 124.

Any suitable component or combination of components can be used for controller 112, plasma generator 124, electromagnetic accelerator 126, positive terminal 114, negative terminal 118, conductor 116, and sensor(s) 122. For example, plasma generator 124 can be implemented by strong electric fields, electron beams, microwaves, and other phenomena and/or components capable of generating plasma. Electromagnetic accelerator can be implemented with one or more suitable device(s) capable of generating an electrical field transverse to a magnetic field.

Figure 3:
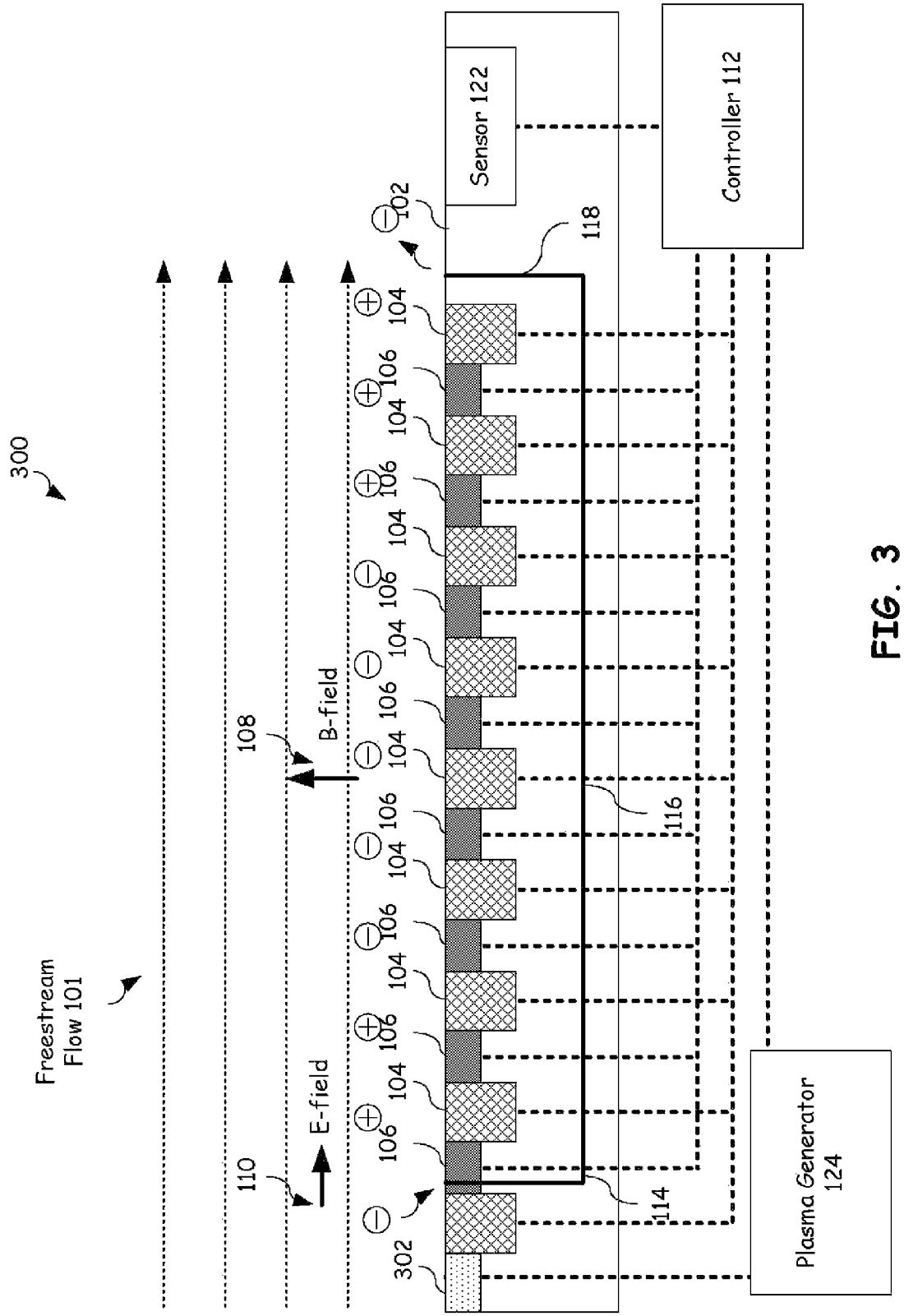
FIG. 3 depicts a third axial flow plasma accelerator that may be used to manipulate fluid flow over a surface in accordance with embodiments of the present invention

FIG. 3 depicts an embodiment of another fluid flow system 300 configured to manipulate a continuous fluid flow 101. Controller 112 is coupled to regulate electrodes 104 to generate an electric field that accelerates flow 101. Electrodes 104 may be pulsed at one or more desired frequencies, and/or operated to apply a continuous electric field. The functions of plasma generator 124 can be performed by electron beams being injected into the fluid flow above surface 102 through electron beam windows 302 to ionize fluid flow 101. Windows 302 may be heated by electron beams 308, and are of sufficient mechanical strength for the environment in which surface 102 is utilized. Any suitable type of window 302 can be utilized. For example, in some configurations, thin metallic foils with passive cooling can be utilized for windows 302. In other configurations with electron beams of relatively high current densities, either active cooling or plasma windows can be utilized. Windows 302 typically comprise only a portion of one or more walls of surface 102. For example, FIG. 3 shows windows 302 as a rectangular strip; however any suitable number, shape, and configuration of windows 302 can be used. The amount of ions generated can also be varied, as required, by controlling generation of electron beams.

Surface 102 can be configured with one or more magnet devices 106 that can be operated by controller 112 to create a transverse magnetic field normal to the direction of the electric field. Electrodes 104 and magnet devices 106 together perform at least some of the functions of an electromagnetic field generator. Magnetic devices 106 such as permanent magnets, electro-magnets, and/or superconducting magnets can be used to generate a magnetic field that is aligned approximately normal to the electric field E and flow 101. Other suitable devices for generating a magnetic field can be used, in addition to, or instead of, magnet devices 106. Additionally, although magnet devices 106 are shown distributed over the length of surface 102, one or more magnet devices 106 can be positioned in any one or more suitable locations on surface 102.

Surface 102 may be a seamless aerodynamic or hydrodynamic surface over which fluid flow passes. This surface may also be any structural or control surface. Fluid flow can be any suitable liquid, gaseous, and/or solid su stance(s) supplied from any suitable source (s). Electron beams can increase the ionization of flow, which can be supplied as a non-ionized, partially ionized, or fully ionized substance, as required.

Figure 4:
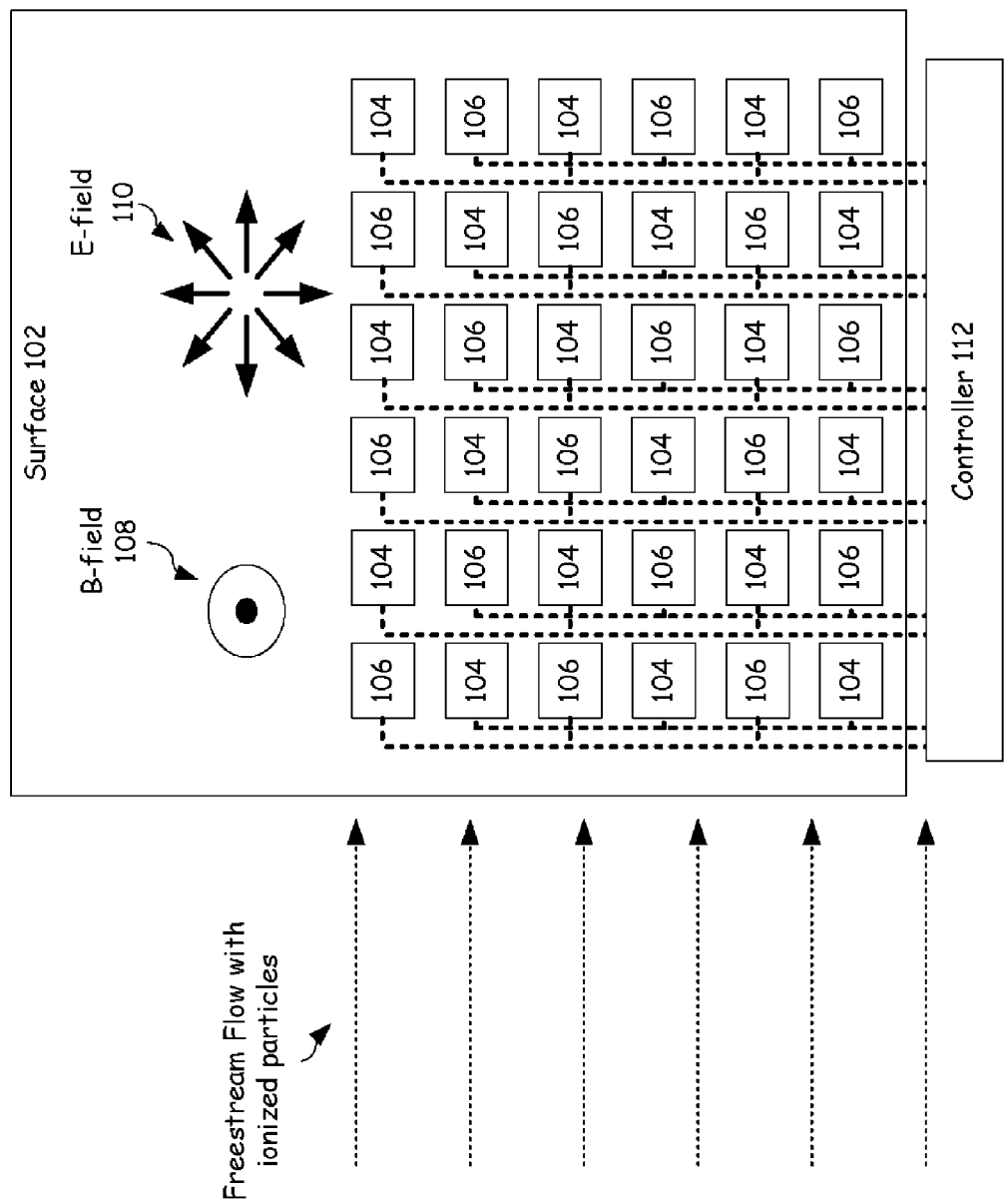
FIG. 4 depicts an plasma accelerator that may be used to manipulate fluid flow in both a spanwise and chordwise direction over a surface in accordance with embodiments of the present invention

FIG. 4 depicts an embodiment of a fluid flow system 400 configured to manipulate a continuous fluid flow 101 both chordwise and spanwise. The embodiments discussed above primarily use the electrodes to accelerate ions in the direction of the flow field. Other embodiments may cause the ions to be deflected within the plane of the flow field. For example, in the case of a flow field over a wing of an aircraft one embodiment may accelerate the ionized fluid flow chordwise. Another embodiment may manipulate the electric fields so as to direct the ions within the fluid flow in a spanwise direction. FIG. 4 depicts an array of electrodes 102 are embedded within aerodynamic surface 102. Fluid flow 101 flows in a fore to aft direction over surface 102. Magnetic material 106 is embedded proximate to the array of electrodes 102. The magnetic field associated with the array is substantially normal to the local surface 102. The electric field 110 is in a plane substantially normal to a magnetic field 108. However, by controlling the potential at various electrodes within electrode array 102 the electric field may be made to travel in any direction within that plane (i.e. chordwise or spanwise).

Referring to FIGS. 1-4, the electrodes can be arranged in electrode pairs with alternating polarity. Controller 112 can activate and deactivate each pair of electrodes in series over a period of time. For example, at time T1, a first pair of electrodes 104 is activated. At time T2, the first pair of electrodes 104 is deactivated and the second pair of electrodes 104 is activated. At time T3, the second pair of electrodes 104 is deactivated and the third pair of electrodes 104 is activated, and so on. When the last pair of electrodes 104 is deactivated, the first pair can be activated to begin the series over again, causing a wave of pulsing electric field E to "travel" across the surface. Such an arrangement of electrodes 104 can be used in various embodiments of fluid flow systems, including systems 100 (FIG. 1), 200 (FIG. 2), 300 (FIG. 3), and 400 (FIG. 4).

Note that various embodiments of fluid flow systems 100 (FIG. 1), 200 (FIG. 2), 300 (FIG. 3), and 400 (FIG. 4) do not require moving mechanical components to manipulate the fluid flow above the surface. The electrodes can be pulsed at frequencies above those that can be achieved with mechanical components in other types of zero-net-mass jets. Additionally, the strength of the electric field E proximate to surface 102, the magnetic field B proximate to surface 102, and the ionization of flow, can be adjusted to achieve fluid flow with greater control than those generated by mechanical systems. Fluid flow systems 100, 200, 300, 400 can be configured with components that can withstand very high speeds and temperatures. Accordingly, fluid flow can be manipulated/generated to control flow at hypersonic temperatures and speeds, as well as lower temperatures and speeds.

The ability to manipulate and control fluid flows has tremendous potential for improving system performance in diverse technological applications, including: mixing and combustion processes, boundary layer flow of aerodynamic surfaces, pressure shock stabilization, engine inlet boundary layer diversion, inlet duct secondary flow control, and thrust management, among others. Shear flow is typically receptive to small disturbances within a limited frequency band and, as a result, these disturbances are rapidly amplified and lead to substantial modification of the primary flow and the performance of the system in which it is employed.

Embodiments of the present invention can be used in a variety of industrial applications such as a smokestack, where it may be desirable to direct a plume of a smokestack with ejectors to drive the smoke and exhaust in a certain direction. These embodiments can be used to pump additional mass flow in an engine, or in the ventilation or environmental control system of a machine or vehicle. Some embodiments can boost pumping capacity by 100% or more over a steady-state ejector, essentially doubling the pumped mass flow. Embodiments can also be used to cool electronic equipment, as well as other devices.

Figure 5:
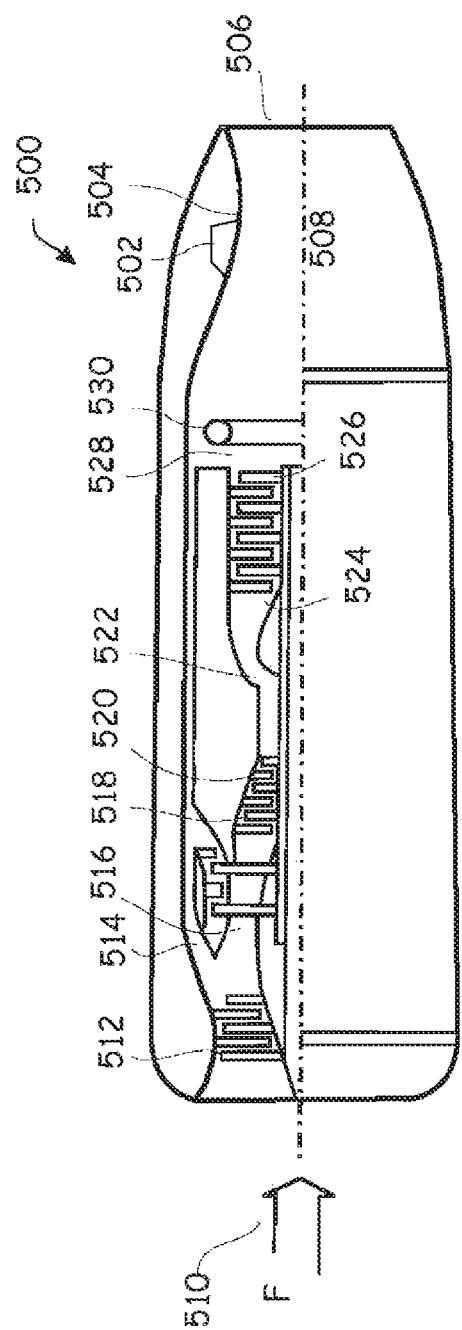
FIG. 5 shows an embodiment of engine configured with plasma accelerators to vector fluid flow at the throat and/or exit areas in accordance with embodiments of the present invention.

FIG. 5 shows an embodiment of engine 500 configured with plasma accelerators 502 to vector fluid flow at the throat 504 and/or exit areas 506 of nozzle 508. As primary flow 510 of air enters jet engine 500 through fan section 512, comprised of a plurality of rotating fan blades, pushes flow 510 into bypass section 514 and compressor section 516. Compressor section 516 is comprised of a plurality of compressor blades 518, 530 which compress flow 510 into combustion chamber 522. Fuel is mixed with flow 510 in combustion chamber 522 and ignited, thereby adding energy to flow 510, increasing the temperature of flow 510 in combustion chamber 522. Pressure within combustion chamber 522 forces flow 510 into turbine section 524, which is comprised of a plurality of turbine blades 526. Turbine section 524 removes some energy from flow 510 to power compressor section 518 and turbine section 524. Flow 510 then passes into exhaust chamber 518 where it combines with the flow from bypass section 514. An afterburner 530 can provide additional fuel, which can be ignited to increase the energy of flow 510. Flow 510 is then expelled from engine 500 through exit 506 as an exhaust flow.

Engine 500 creates thrust related to the velocity of the mass and density of the air of flow 510 over a given time period. Typically, in a jet engine, flow 510 is a subsonic flow of air until it reaches throat 504. Nozzle 508 cooperates with exit 506 to accept flow 510 from exhaust chamber 528 and to accelerate exhaust flow 510 to higher velocities, typically supersonic velocities. To achieve optimum acceleration of the exhaust flow, nozzle 508 converges the flow at throat 504, which is the point or section in nozzle 508 having the smallest cross sectional area, the constriction of throat 504 typically accelerating flow 510 to a sonic velocity, and a supersonic velocity after throat 504. Constriction of flow 510 at throat 504 operationally translates energy in flow 510 from pressure and temperature into velocity, thus creating thrust opposite to the vector of flow 510 as flow 510 exits nozzle 508. Although nozzle 508 is depicted as a fixed geometry nozzle, it should be understood that variable geometry nozzles could be incorporated in engine 500 to enhance control of the exhaust flow.

In engine 500 plasma accelerators 502 can be located at different positions to affect different performance parameters of engine 500. Additionally, the pulse frequency and amplitude of the electric field, magnetic field and ion generation/injection can be varied to optimize performance.

Plasma accelerators can generate pitch, roll, and yaw control moments by deflecting the primary flow over the surface of an aerodynamic or hydrodynamic vehicle. Vertical deflections cause pitching moments, and horizontal deflections cause yawing moments. Multiple plasma accelerators can be positioned at desired locations relative to the axes of the vehicle so that vertical deflections cause pitching moments, differential vertical deflections cause rolling moments, and horizontal deflections cause yawing moments.

Figure 6:
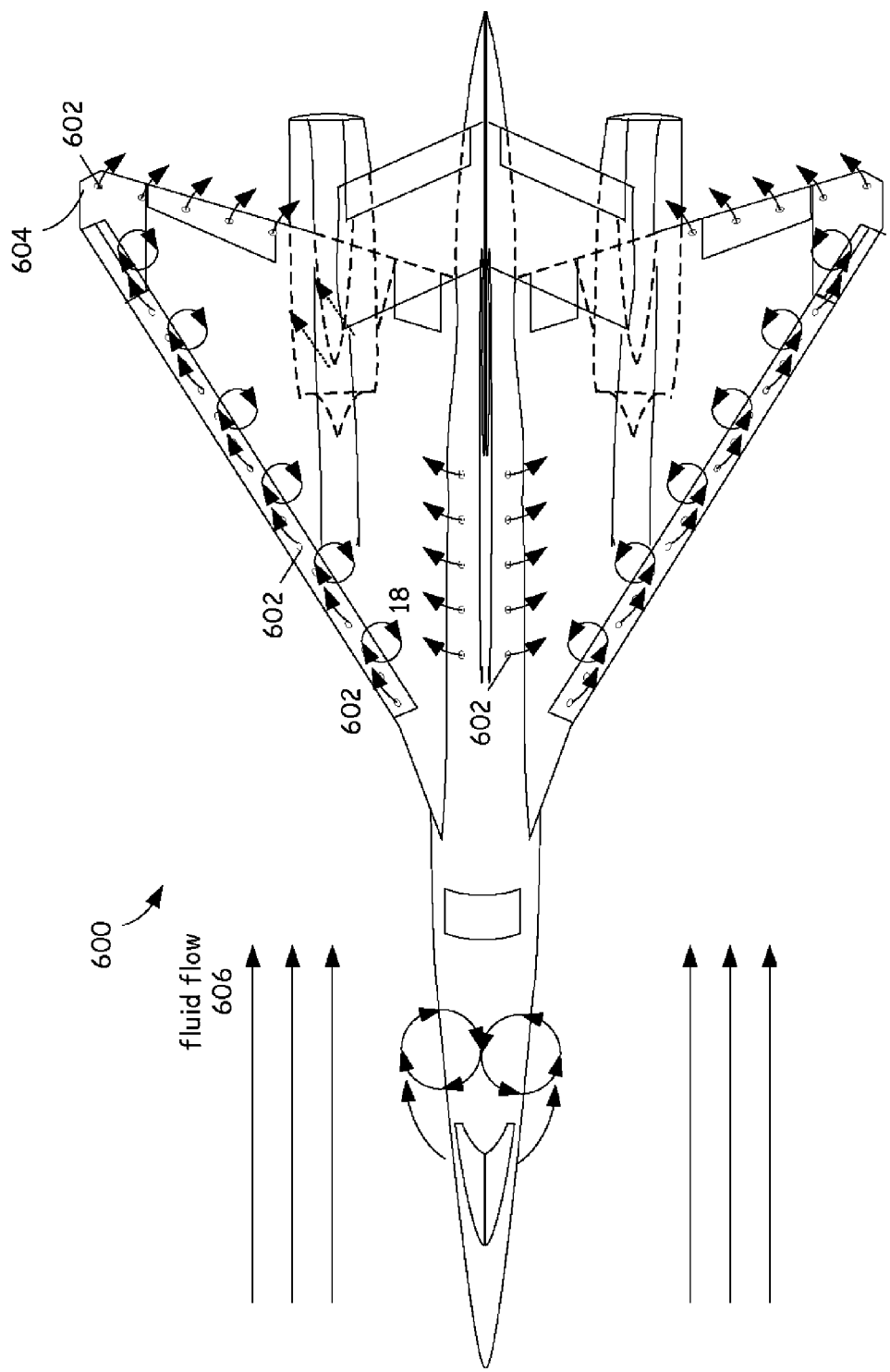
FIG. 6 shows an embodiment of aircraft configured with plasma accelerators to vector fluid flow in both a spanwise and chordwise direction in accordance with embodiments of the present invention.

Plasma accelerators can also be used in a wide variety of other applications, including modifying the shape of aerodynamic surfaces, such as airfoils. FIG. 6 shows an embodiment of aircraft 600 with plasma accelerators 602 embedded in the surface of wings 604. The cross-section of wings 604 along the longitudinal axis 606 of aircraft 600 form an airfoil, that is shaped to create a pressure difference between the upper surface (suction side) and pressure increase on the lower surface (pressure surface) to produce a lifting force. Airfoils can be used in many devices, including, but not limited to, wings, canards, horizontal and vertical stabilizers, rotor blades for propellers, fans, compressors, turbines, helicopter blades, and stator vanes for compressors and turbines. The capability to alter the aerodynamic performance of a device by altering its shape (e.g., the "camber" of an airfoil) during various phases of operation can lead to significant performance improvements.

In operation, the airfoil creates a pressure difference from a suction surface on one side of airfoil to a pressure surface on an opposite side by imposing on the fluid flow a greater curvature on the suction surface than on the pressure surface. A reduction of the efficacy of airfoil results, however, when the fluid flow boundary layer separates from the suction surface. One strategy for reducing the tendency toward boundary layer separation is to utilize plasma accelerators such as those discussed with reference to FIGS. 1-4 to attach or keep attached the boundary layer at the surface. Typically, the effectiveness of this strategy increases as the velocity of the injected fluid approaches the velocity of the bulk fluid flow.

Although discussed as a single plasma accelerator, an array of plasma accelerators may be located within wing 604. Other arrangements of plasma accelerators are possible, for example, fluid flows 602 can be configured in a two-dimensional array, as well as in the lower and/or upper skin of wing 604. Multiple plasma accelerators can be individually addressable, and all, or only a select portion, of plasma accelerators may be activated at one time. In this manner, the apparent aerodynamic shape of the wing 604 may be specifically tailored for a given flight regime. If wing 604 is configured with pressure, or other appropriate sensors, then a control computer can evaluate the forces on the wing during flight and determine the appropriate fluid flows 602 to activate in order to optimally tailor the effective aerodynamic shape of airfoil 1102.

It is anticipated that plasma accelerators can also be used on leading and/or trailing edges of various portions of an aircraft or other device, in addition to, or instead of, conventional control surfaces, such as rudders, ailerons, flaps, elevators, among others, to control the attitude and position of the device in which plasma accelerators are installed. For example, on an aircraft, arrays of plasma accelerators can be positioned in both wings and operated to create higher lift on one side of the center of gravity of the aircraft than on the other. The asymmetrical lifting force will cause a rolling moment, similar to the effect of aileron deflections in a conventional aircraft. One advantage of fluid flows 602 over conventional control surfaces is the absence of hinge lines, which have a higher RADAR cross-section than fluid plasma accelerators. Accordingly, a device that incorporates plasma accelerators instead of conventional hinged control surfaces will be less observable with RADAR sensors.

More aft locations can also be used with fluid flows 606 pointing more directly downstream to increase lift through pressure reduction, increase L/D, delay separation and thereby increase the maximum attainable lift ($C_{Lmax}$), and even provide primary thrust for some applications. Differential application of plasma accelerators can also be used to provide pitch, roll, and yaw control. Plasma accelerators can also be used near leading and/or trailing edges to replace the conventional control surfaces.

In addition to the aerodynamic forces, acceleration or deceleration of the air flowing around an aircraft creates a direct thrust (or drag) force on the aircraft. The moment added to the air stream by fluid flows 606 can create a reaction force on the aircraft. This force can be a significant thrust on the vehicle, which can be applied symmetrically, or asymmetrically to provide additional control moments.

Figure 7:
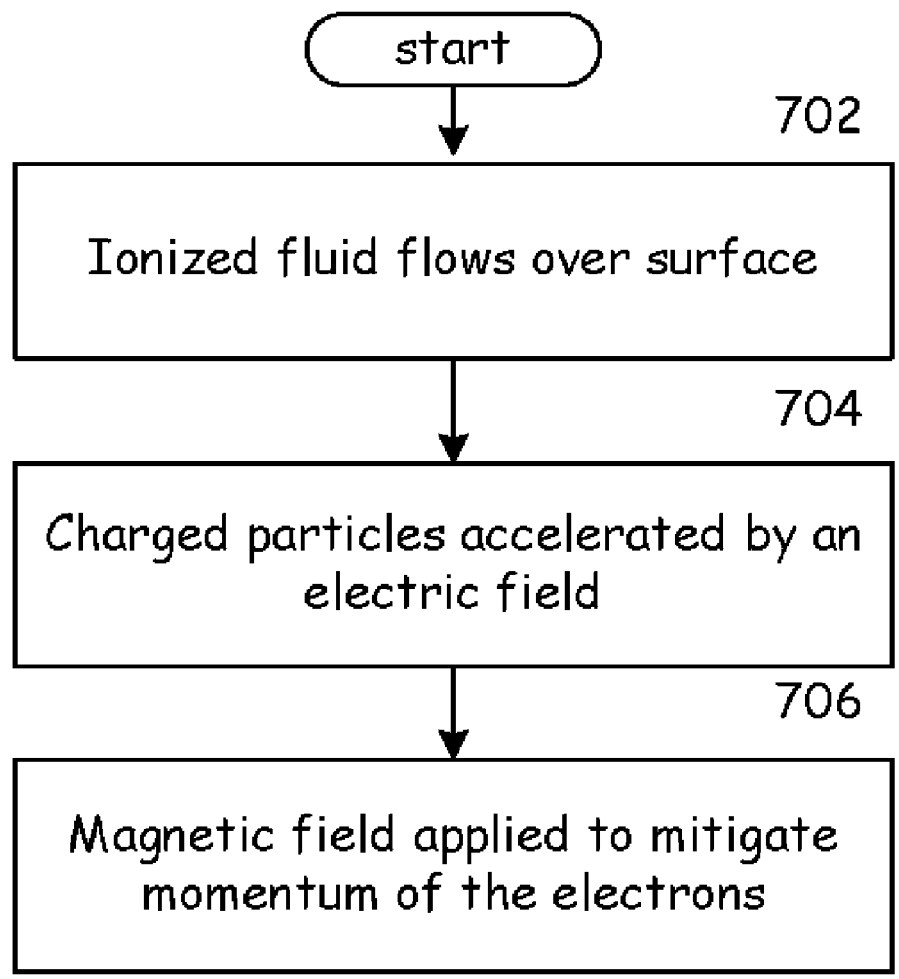
FIG. 7 is a logic flow diagram illustrating a method to manipulate a fluid flow over a surface such as an aerodynamic or hydrodynamic surface in accordance with embodiments of the present invention.

FIG. 7 provides a logic flow diagram illustrating a method to manipulate a fluid flow over a surface such as an aerodynamic or hydrodynamic surface. This improved flow may result in an increase lift to drag ratio, reduced flow noise, reduced drag, or the better attachment of the fluid flow to the surface. Operations 700 begin with Step 702 where an ionized fluid flows over the surface. The degree of ionization of this fluid may vary from very weak ionization to very strong ionization. In Step 704 charged particles, i.e., ions, are accelerated in directions parallel i.e., in directions within the plane of the fluid flow over the surface. This may be done by using an array of embedded electrodes within the surface that generate the electric field. The magnitude, strength and relative motion of the electric field may be controlled by adjusting the potentials applied to individual electrodes. Other embodiments may vary this direction by manipulating the potential applied to the individual electrodes in order to accelerate the ions in a spanwise direction as well. In Step 706, a magnetic field is applied normal to the plane substantially containing the fluid flow. This magnetic field creates a large force on electrons. The force of the magnetic field mitigates the momentum of the electrons. Furthermore, these electrons may be collected with a positive electrical terminal such as a cathode and then injected into the fluid flow using an anode to help neutralize the charge of the fluid flow. This magnetic field may be the result of embedded magnets within the circuits. In embodiments where the fluid flow was a largely un-ionized fluid the fluid flow may be ionized upstream of the electrode array. By controlling the amplitude and direction of the electric field as well as the amplitude of the magnetic field. The ionized fluid flow may be manipulated over the surface.

Other embodiments may provide a method to reduce flow noise of a fluid over the vehicle surface. This may result in reducing the drag of the vehicle's surface. For example, in one embodiment, the flow noise of a liquid over a vehicle surface or within a ducted flow may be reduced. In a ducted flow environment, this may result in reduced head loss associated with the ducting system allowing the amount of force used to be used more efficiently to supply fluid within the ducted system. Charged particles within the ionized fluid that flows over a surface are accelerated in directions within the plane of the fluid flow over the surface. This may be done by using an array of embedded electrodes within the surface that generate the electric field. The magnitude, strength and relative motion of the electric field may be controlled by adjusting the potentials applied to individual electrodes.

Other embodiments of the present invention may apply the ability to manipulate a free stream fluid flow over vehicle surface in order to provide a vehicle control system. While yet other embodiments may simply provide seamless control surfaces that may manipulate the free stream fluid flow over the control surface.

Other embodiments of the present invention may apply plasma accelerators to cool heat-producing bodies, which is a concern in many different technologies, such as integrated circuits in single- and multi-chip modules (MCMs).

Embodiments of the present invention may enable new and improved designs of tactical aircraft by allowing unconventional aerodynamic shapes. This is in part achieved by the weight reduction associated new flow control systems when compared to conventional systems. Additionally, flow control can reduce cyclic fatigue of components located within fluid flow.

The present invention may be used to improve flow behavior in hydrodynamic applications as well. This may minimize head loss in a piping system, reduce flow noise within a piping system or over a submerged structure or to control and manipulate hydrodynamic flow about a watercraft for direction and thrust control.

Further embodiments of the present invention may include air-handling units such as HVAC systems, chemical processors, automobile air intake manifold or biomedical applications. However, the present invention should not be limited to these applications.

In summary, a method to manipulate a fluid flow over a surface is provided. This method may be used to reduce drag, improve the lift to drag (L/D) ratio, attach fluid flow, or reduce flow noise at the surface. This involves flowing a fluid over the surface wherein the fluid contains positively charged ions and electrons. An electric field accelerates ions and electrons in directions parallel to the electric field. A magnetic field at the surface redirects ions and electrons based on their velocity and charge. The magnetic field imparts little force on the relatively heavy and slow moving positive ions but has a significant impact on the relatively fast moving, light weight electrons. This results in a non-zero net change in the total momentum of the positive ions and electrons allowing thrust to be realized. This thrust may be sufficient for vehicle propulsion or manipulation of the fluid flow around the vehicle. Pulsed and traveling wave implementations of this body force enable exploitation of frequencies to which the flow is sensitive, improving effectiveness of this method.

Embodiments of the present invention provide a significant advantage over prior techniques used to manipulate fluid flow over a surface in that embodiments of the present invention provide the ability to have a seamless surface over which the fluid flow is manipulated. When compared to traditional flow control methods or flow control methods using synthetic jet actuators, disturbances or discontinuities are required in the surfaces over which the fluid flow is manipulated. Embodiment of the present invention may utilize plasma (charged particles) which may then be used to manipulate flow control over the surface with no moving parts, thus no discontinuities are required in the surface.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed:

1. An aircraft, comprising:
    a turbojet engine that provides propulsion for the aircraft;
    a wing having a trailing edge with flight control surfaces on opposite sides of a longitudinal axis of the aircraft, the flight control surfaces being immovable relative to the wing;
    a geometric grid of individual electrodes and individual magnets embedded within each of the flight control surfaces, the electrodes and magnets alternating with each other within the grid in more than one direction, the electrodes, when supplied with electrical power, creating electric fields on each of the flight control surfaces, the magnets creating magnetic fields on each of the flight control surfaces;
an electron beam window formed in each of the wings upstream from the electrodes and the magnets;
an electron beam generator within the wing adjacent each of the windows, each electron beam generator creating an electron beam that passes through one of the windows into a boundary layer of an airstream passing over each of the flight control surfaces, creating positively charged ions and electrons in the boundary layer upstream from each of the grids and downstream from a leading edge of the wing, the ions being accelerated by the electric field in a direction parallel to the electric field, the electrons being accelerated by the electric field in a direction opposite to the ions, and the magnetic field mitigating momentum of the electrons;
a conductive upstream terminal positioned on each of the flight control surfaces upstream from the electrodes and the magnets for collecting electrons moving in an upstream direction in response to the electric field generated by the electrodes;
a conductive downstream terminal positioned on each of the flight control surfaces downstream from the electrodes and the magnets;
a conductive lead extending between the terminals for conveying electrons from the upstream terminal to the downstream terminal, which discharges the electrons into the air flow; and
a controller that controls power to the electrodes to affect a boundary layer of air flowing over each of the flight control surfaces to control attitude and position of the aircraft.

2. The aircraft of claim 1, wherein each of the geometric grids comprises a plurality of parallel rows, each of the rows containing the electrodes and the magnets in an alternating pattern.

3. The aircraft of claim 1, wherein the two directions are perpendicular to each other.

4. The aircraft of claim 1, wherein:
the electrodes and the magnets on each of the flight control surfaces are within a plurality of spanwise rows extending in a spanwise direction of the wing and a plurality of chordwise rows extending in a chordwise direction of the wing; and
individual ones of the magnets and the electrodes in the spanwise rows alternate with each other, and individual ones of the magnets and the electrodes in the chordwise rows alternate with each other.

5. The aircraft of claim 4, wherein the spanwise rows are perpendicular to the air flow across the flight control surfaces, and the chordwise rows are perpendicular to the spanwise rows.

6. The aircraft of claim 1, wherein the controller controls an electrical potential at various ones of the electrodes on the control surfaces to cause the electric field on each of the control surfaces to selectively travel in more than spanwise and chordwise directions.

7. The aircraft of claim 1, wherein each of the electron beam windows comprises a metallic foil window through which the electron beam generators discharge the electron beams.

8. The aircraft of claim 1, further comprising:
leading edge flight control surfaces adjacent the leading edge of the wing on opposite sides of the longitudinal axis; and wherein
each of the leading edge flight control surfaces also contains one of the geometric grids of electrodes and magnets.

9. An aircraft, comprising:
a turbojet engine that provides propulsion for the aircraft;
a wing having a trailing edge with flight control surfaces on opposite sides of a longitudinal axis of the aircraft, the flight control surfaces being immovable relative to the wing;
a geometric grid of electrodes and magnets embedded within each of the flight control surfaces, the grid comprising a plurality of first rows extending parallel to each other in a first direction and a plurality of second rows extending parallel to each other in a second direction that is perpendicular to the first direction;
each of the electrodes alternating with one of the magnets within each of the first rows and also within each of the second rows;
electron beam windows upstream from the grids of electrodes and magnets and downstream from a leading edge of the wing;
electron beam generators positioned within the wings and directing electron beams through the electron beam windows, creating positively charged ions and electrons within an airstream passing over the wing that are acted upon by electric and magnetic fields created by the electrodes and the magnets;
a controller for supplying voltage potentials to selected ones of the electrodes to affect a boundary layer of air flow over each of the flight control surfaces to control attitude and position of the aircraft;
a conductive upstream terminal positioned on each of the flight control surfaces upstream from the grids for collecting electrons moving in an upstream direction in response to the electric field generated by the electrodes;
a conductive downstream terminal positioned on each of the flight control surfaces downstream from the grids; and
a conductive lead extending between the terminals for conveying electrons from the upstream terminal to the downstream terminal, which discharges the electrons into the air flow.

10. The aircraft of claim 9, wherein the first direction is parallel with a direction of the airflow.

11. The aircraft of claim 9, wherein the controller controls an electrical potential at various ones of the electrodes on the control surfaces to as to cause the electric field on each of the control surfaces to selectively travel in more than spanwise and chordwise directions.

12. The aircraft of claim 9, further comprising:
leading edge flight control surfaces that are immovable relative to the wing, the leading edge flight control surfaces being adjacent the leading edge of the wing on opposite sides of the longitudinal axis; and wherein
the grids of the electrodes and the magnets are also located on the leading edge flight control surfaces.

13. A method of controlling flight of an aircraft, comprising:
providing the aircraft with a wing having a trailing edge with flight control surfaces on opposite sides of a longitudinal axis of the aircraft, the flight control surfaces being immovable relative to the wing;
mounting a geometric grid on each of the flight control surfaces, the grid comprising a plurality of first rows extending parallel to each other in a first direction, and a plurality of second rows extending parallel to each other in a second direction, each of the rows comprising a plurality of individual electrodes and individual magnets, each of the electrodes within each of the rows being separated from adjacent electrodes within the same row by one of the magnets;

propelling the aircraft in flight with a turbojet engine;

providing voltage potentials to the electrodes to create electrical fields on each of the flight control surfaces, and creating magnetic fields with the magnets on each of the flight control surfaces;

providing a conductive upstream terminal positioned on each of the flight control surfaces upstream from the electrodes and the magnets for collecting electrons moving in an upstream direction in response to the electric field generated by the electrodes;

providing a conductive downstream terminal positioned on each of the flight control surfaces downstream from the electrodes and the magnets;

providing a conductive lead extending between the terminals for conveying electrons from the upstream terminal to the downstream terminal, which discharges the electrons into the air flow;

with an electron beam generator located within the wing, directing an electron beam through an electron beam window into boundary layer air flowing, over the wing, generating a plasma upstream from each of the grids on each of the flight control surfaces, but downstream from a leading edge of the wing, creating positively charged ions and electrons that are acted upon by electric and magnetic fields created by the electrodes and the magnets; and controlling pitch, roll and yaw of the aircraft by varying the voltage potentials to the electrodes to affect a boundary layer of air flow over each of the flight control surfaces.

14. The method of claim 13, wherein controlling the voltage potentials selectively causes pressure changes on upper surfaces of the flight control surfaces.

15. The method of claim 13, wherein:

the aircraft also has immovable flight control surfaces adjacent the leading edge on opposite sides of the longitudinal axis;

each of the flight control surfaces adjacent the leading edge also contains one of the grids of the electrodes and the magnets; and the method further comprises changing a camber of the leading edge of the wing by controlling the voltage potentials of the electrodes on the flight control surfaces adjacent the leading edge of the wing.

* * * * *